United States Patent
Sang et al.

(10) Patent No.: US 7,254,204 B2
(45) Date of Patent: Aug. 7, 2007

(54) METHOD AND SYSTEM FOR OFDM SYMBOL TIMING SYNCHRONIZATION

(75) Inventors: Tzu-Hsien Sang, Chia-I (TW); Tsung-Liang Chen, Tainan Hsien (TW)

(73) Assignee: Afa Technologies, Inc., Hsin-Tien, Taipei Hsien (TW)

( * ) Notice: Subject to any disclaimer, the term of this patent is extended or adjusted under 35 U.S.C. 154(b) by 787 days.

(21) Appl. No.: 10/604,614

(22) Filed: Aug. 5, 2003

(65) Prior Publication Data

US 2005/0063480 A1 Mar. 24, 2005

(51) Int. Cl.
*H04L 7/00* (2006.01)

(52) U.S. Cl. ........................................ 375/355

(58) Field of Classification Search ........ 375/260–261, 375/285, 324, 326, 355; 370/206, 210, 491, 370/503
See application file for complete search history.

(56) References Cited

U.S. PATENT DOCUMENTS 6,456,654 B1 * 9/2002 Ginesi et al. ............... 375/229
6,628,735 B1 * 9/2003 Belotserkovsky et al. .. 375/355
6,628,738 B1 * 9/2003 Peeters et al. ............... 375/371
6,744,821 B1 * 6/2004 Van Acker et al. ......... 375/260
7,133,474 B2 * 11/2006 Ramasubramanian et al. ... 375/343

* cited by examiner

*Primary Examiner*—Khanh Tran
(74) *Attorney, Agent, or Firm*—Winston Hsu

(57) ABSTRACT

A method includes converting a received time domain digital signal to a corresponding frequency domain digital signal, calculating phase angles of tones of at least one symbol of the frequency domain digital signal when a symbol timing offset exists, and calculating at least one differential phase offset (DPO). A DPO is the difference between two consecutive gaps, a gap being the difference between the phase angle of a tone of the symbol of the frequency domain digital signal when the timing offset of the symbol exists and a correct phase angle of the tone of the symbol of the frequency domain digital signal. The method estimates the symbol timing offset with at least one DPO.

13 Claims, 3 Drawing Sheets

METHOD AND SYSTEM FOR OFDM SYMBOL TIMING SYNCHRONIZATION

BACKGROUND OF INVENTION

1. Field of the Invention

The present invention relates to communications systems, and more particularly, to symbol timing synchronization in an OFDM system.

2. Description of the Prior Art

In orthogonal frequency division multiplexing (OFDM) communication systems, data is modulated by tones used by the system. A transmitter transmits OFDM symbols contiguously in a packet and therefore conveys a continuous information data flow to the receiver. The transmission, however, will be distorted by the unknown characteristics of the channel. Therefore, the received OFDM symbols in a packet may not be recognizable as the original transmitted OFDM symbols. In situations like this, the receiver needs to perform certain signal processing tasks before it can retrieve the original OFDM symbols. The most significant adverse effect in a channel is Inter-Symbol Interference (ISI). When ISI occurs, waveforms of contiguous OFDM symbols interfere with each other leading to unrecoverable distortion. To mitigate the effect of ISI, some OFDM based systems, such as VDSL or HomePlug, introduce a so-called circular prefix and/or suffix. These prefixes and/or suffixes are inserted between contiguous OFDM symbols and act as guardian intervals to reduce the possibility that waveforms interfere with each other.

At the receiver side, therefore, it is crucial to reduce distortion caused by ISI as much as possible such that contiguous OFDM symbols can be separated, i.e., the boundaries of each OFDM symbols can be set such that no substantial "leakage" from neighboring OFDM symbols exists. The task of properly determining the start and end of each individual OFDM symbol and then compensating any timing offset is called symbol timing synchronization, or symbol synchronization. Often a training signal sequence is used to facilitate this task.

Symbol timing synchronization refers to the task of finding the precise moment when an individual OFDM symbol starts and ends, and is an essential task for a digital communication system. After a packet detector has provided an estimate of the start of the packet, a symbol timing synchronization algorithm refines the estimate to sample level precision. Most of the existing methods of symbol timing synchronization fall into two major categories. The first is based on signal processing in frequency domain. This type of method first calculates the fast Fourier transform (FFT) of the received signal and the phase angle of each tone. The differences between the phase angles of each tone and a set of pre-determined reference phase angles are calculated. Then the phase differences are processed by, for example, fitting to a linear regression model. In this case, the timing offset can be estimated from the slope of the regression line. The second category is based on signal processing in time domain. Usually the received signal is correlated with a pre-determined reference time-domain signal. Then, for instance, the peak of the correlation function obtained can be used to determine the timing offset.

Time domain methods often suffer significant performance degradation when strong narrowband interference (NBI) or Gaussian noise is present. Properly designed frequency domain methods can achieve excellent performance. However, they often suffer from heavy computation required by processing the phase angles obtained from the FFT of received signals. Also, due to their reliance on sophisticated signal processing algorithms, often they are not robust enough under conditions of severe noise. In this invention, a frequency domain method with low complexity for OFDM symbol timing offset estimation is described.

SUMMARY OF INVENTION

It is therefore a primary objective of the claimed invention to provide a method of symbol timing synchronization in frequency domain for OFDM communication systems.

Briefly described, the claimed invention discloses a low complexity and high performance system for orthogonal frequency division multiplexing (OFDM) symbol timing synchronization in frequency domain. The method comprises converting a received time domain digital signal to a corresponding frequency domain digital signal; calculating phase angles of tones of at least one symbol of the frequency domain digital signal when a symbol timing offset exists; calculating at least one differential phase offset (DPO), which is the difference between two consecutive gaps, wherein a gap is the difference between the phase angle of a tone of the symbol of the frequency domain digital signal when the timing offset of the symbol exists and a correct phase angle of the tone of the symbol of the frequency domain digital signal; and estimating the symbol timing offset with at least one DPO.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
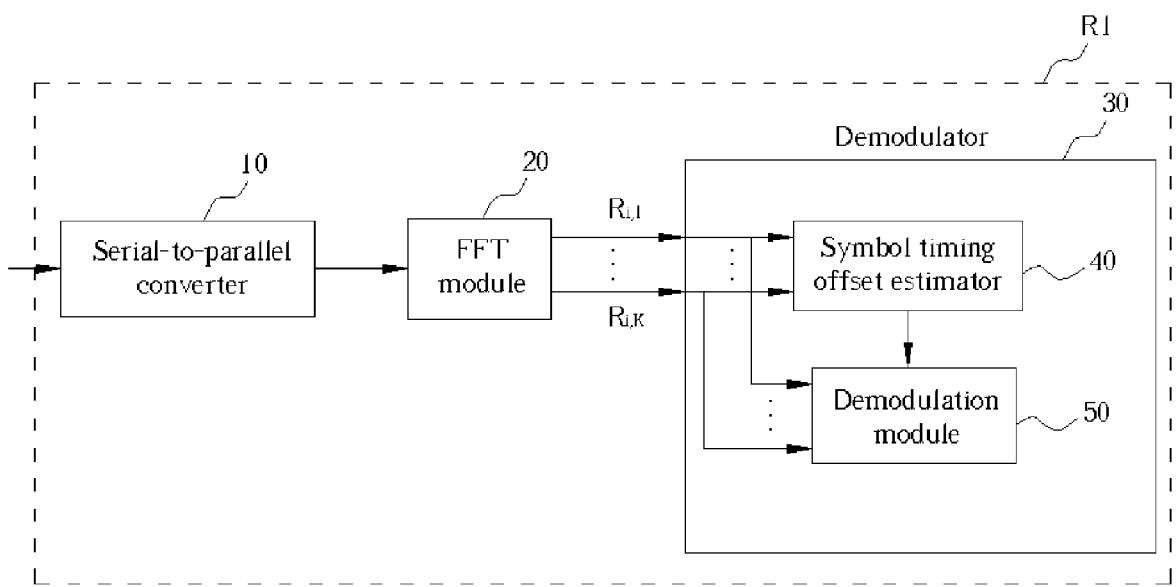
FIG. 1 is a block diagram of an OFDM receiver according to the present invention.

Please refer to FIG. 1. FIG. 1 is a block diagram of an OFDM/DMT receiver R1 according to the present invention. A serial-to-parallel converter 10 is capable of performing serial-to-parallel conversion on input time domain digital signals. A fast Fourier transform (FFT) module 20 is electrically connected to the serial-to-parallel converter 10 and transforms the time domain digital signals to obtain a frequency spectrum for demodulation. A demodulator 30 is electrically connected to the FFT module 20 to perform the demodulation. The demodulator 30 comprises a demodulation module 50 for demodulating the frequency domain digital signal and a symbol timing offset estimator 40 electrically connected to the FFT module 20. Complex output of the FFT is denoted as $R_{i,k}$ for the kth tone of the ith received symbol. $R_{i,k}$ can be modeled as a weighted version of the transmitted symbol corrupted by additive noise. If the cyclic prefix/suffix is inserted in between contiguous OFDM symbols, then the DEMUX block is responsible for removing the prefix and/or suffix before it pass an OFDM symbol to FFT. The task of determining the start and end of each OFDM symbol is conducted by the symbol timing offset estimator 40. Complex output of the FFT module 20 is given by:

$$R_{i,k}=a_{i,k}+b_{i,k}\cdot j=X_{i,k}\cdot H_{i,k}+N_{i,k},\ k=1,\ldots,N,$$

where
k is a tone index,
i is a received symbol index,
$R_{i,k}$ is a received symbol for tone k,
$a_{i,k}$ is the real part of $R_{i,k}$,
$b_{i,k}$ is the imaginary part of $R_{i,k}$,
$X_{i,k}$ is the transmitted symbol for tone k,
$H_{i,k}$ is the channel attenuation for tone k, and
$N_{i,k}$ is channel noise affecting tone k.

That is, $R_{i,k}$ represents a point on the complex plane for tone k of the ith received OFDM symbol.

The concept of differential phase offset (DPO) is introduced as a metric that contains information of any misalignment of symbol timing. Therefore, DPO can be processed to estimate the symbol timing offset. For the sake of simplicity, noise is neglected in the following. The pair of time domain signal x(t) and its FFT $X_k$ is represented as:

as:

$$x(t) \Leftrightarrow X_k = A_k \cdot e^{j\phi_k}.$$

The correspondence varies in the frequency domain as a phase rotation when a timing offset is introduced in time domain as given by:

by:

$$x(t-n) \Leftrightarrow \hat{X}_k = A_k \cdot e^{j\phi_n} \cdot e^{j\frac{2\pi kn}{N}} = A_k \cdot e^{j\left(\phi_n + \frac{2\pi kn}{N}\right)} = A_k \cdot e^{j\psi_k}.$$

where n is the timing offset and N is the symbol length. In the context of symbol timing estimation, $A_k$ is the amplitude, $\phi_k$ is the correct phase angle when there is no symbol timing offset, and $\psi_k$ is the phase angle when the symbol timing offset n exists. The task of symbol timing estimation is to determine the value of n in order to compensate for it and obtain correct phase angles.

Let the phase offset be the gap between received phase angle $\psi_k$ and the correct phase angle $\phi_k$, then DPO (denoted by $\Delta_k$) can be defined for the neighboring k th and (k+1) th tone as the difference, such that:

that:

$$\Delta_k = (\Psi_{k+1} - \phi_{k+1}) - (\Psi_k - \phi_k) = \frac{2\pi(k+1)n}{N} - \frac{2\pi kn}{N} = \frac{2\pi n}{N}.$$

Clearly, the information of symbol timing offset n is encoded in the DPO. Assuming there are K (indexed by k=1 to K) tones in an OFDM symbol, then there will be (K−1) DPOs (indexed by k=1 to K−1) available for one OFDM symbol.

Figure 2:
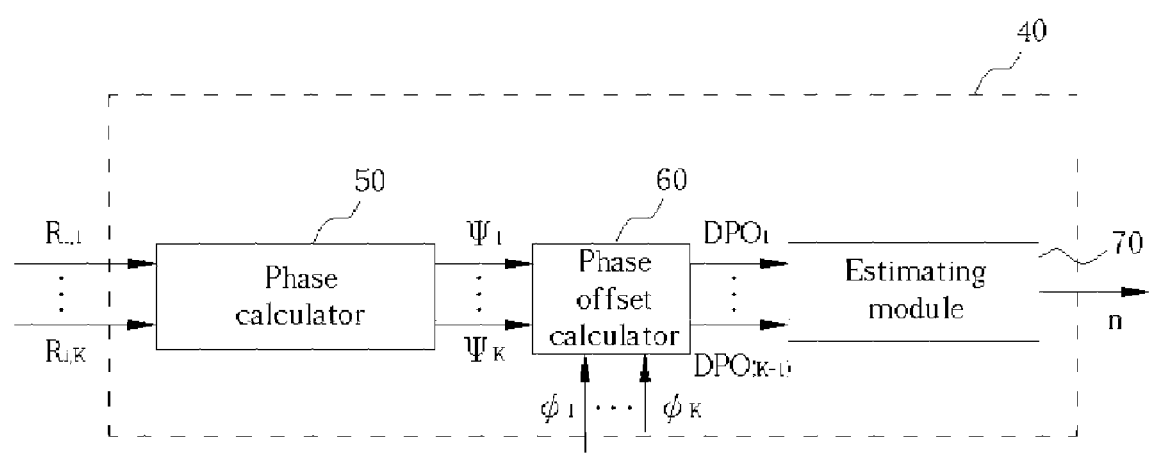
FIG. 2 is a block diagram of the symbol timing offset estimator of FIG. 1.

Please refer to FIG. 2. FIG. 2 is a block diagram of the symbol timing offset estimator 40 of FIG. 1. The symbol timing offset estimator 40 comprises a phase calculator 50, a phase offset calculator 60, and an estimating module 70. The phase calculator 50 is adapted to calculate the phase angles of tones of at least one symbol of the input frequency domain digital signal when a symbol timing offset exists. The phase offset calculator 60 is electrically connected to the phase calculator 50 for calculating at least one DPO. The estimating module 70 is electrically connected to the phase offset calculator 60 and is capable of utilizing the at least one DPO to estimate the symbol timing offset. This implementation realizes the method of symbol timing synchronization of this invention described in the paragraph above.

As for estimating the symbol timing offset with DPOs, three different devices are presented as embodiments of the estimating module 70 to process DPOs to estimate symbol timing offsets. The first is a mean estimator. Ideally, symbol timing offset n can be estimated by averaging the differential phases as follows:

follows:

$$\hat{n} = (N/(K-1)/2\pi)\sum_{k=1}^{K-1}\Delta_k$$

$$= (N/(K-1)/2\pi)\sum_{k=1}^{K-1}((\Psi_{k+1}+\delta_{k+1})-\overline{\phi}_{k+1})-((\Psi_k+\delta_k)-\phi_k)$$

$$= (N/(K-1)/2\pi)\sum_{k=1}^{K-1}[(\Psi_{k+1}-\phi_{k+1})-(\Psi_k-\phi_k)] + \sum_{k=1}^{K-1}(\delta_{k+1}-\delta_k)$$

$$= n + (\delta_K - \delta_1)(N/(K-1)/2\pi)$$

where $\delta_k$ is the phase noise for the k th tone.

The second is a median estimator. This estimator substitutes the averaging mechanism in the "mean" estimator with a median determination, where k is from 1 to (K−1), as follows:

follows:

$$\hat{n}=\text{median}((\Delta_k))\cdot(N/2\pi)$$

The third is a histogram estimator. To estimate the symbol timing offset, a histogram of DPOs is first generated. Then, post-processing of the histogram provides an estimation of symbol timing offset. For instance, the position of the histogram peak indicates the value of 2πn/N.

Figure 3:
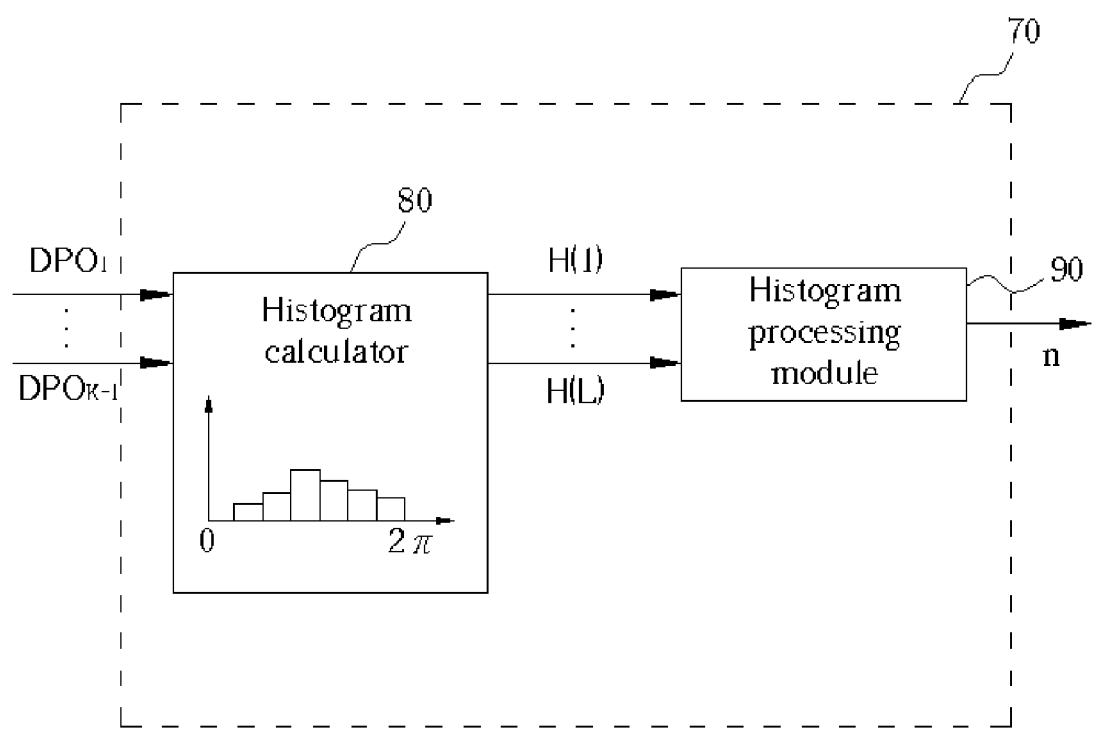
FIG. 3 is a block diagram of the estimating module of FIG. 2.

Please refer to FIG. 3. FIG. 3 is a block diagram of the estimating module 70 employing histogram estimation. In this embodiment, the estimating module comprises a histogram calculator 80 and a histogram processing module 90. In the following, a detailed description of the histogram calculations of the estimating module 70 and preparatory calculations are provided.

First, the gap between the phase angle and the correct phase of each tone is calculated, i.e., for each k, the difference ($\psi_k-\phi_k$) is calculated. Note that since the calculation is done with mod 2π arithmetic, the result will be wrapped within the range of 0 to 2π. Then, the DPO (denoted by $\Delta_k$) is calculated for k=1 to K−1. This calculation is also done with mod 2π arithmetic, and so the result is between 0 and 2π. There are K−1 DPOs calculated for one OFDM symbol, but the receiver is not restricted to use all of them for the purpose of symbol timing synchronization. A subset of the calculated DPOs may be used. Nor is the receiver restricted to use one OFDM symbols worth of data to estimate the symbol timing offset. More than one OFDM symbol can be used if conditions permit. For example, if N OFDM symbols and (K−1) DPOs per symbol are used, there will be N(K−1) DPOs to be processed. In this example, only the case of one symbol is described for the sake of simplicity. The case of multiple symbols is a straightforward generalization that can be done easily.

Next, the histogram of $\Delta_k$ is obtained by the histogram calculator 80 according to the following method. The interval from 0 to $2\pi$ is divided into L bins, denoted as bin no. 1 to bin no. L. Each bin does not necessarily have the same size, but for simplicity, here in the example, the bins have the same size $2\pi/L$, i.e., bin no. 1 is from 0 to $2\pi/L$, bin no. 2 is from $2\pi/L$ to $4\pi/L$, and bin no. L is from $(1-1/L)2\pi$ to $2\pi$. Then, the number of $\Delta_k$ results that fall into each bin is counted. For instance, if there are a total of $4\Delta_k$ results in bin no. 10, then the histogram of $\Delta_k$ will have the value of 4 at bin no. 10. If H(m) denotes the histogram function with m (in the range from 1 to L) as the index of the bins, then in the example mentioned above, H(10)=4.

The histogram of $\Delta_k$ is further processed by the histogram processing module 90 to determine an estimation of n. For one embodiment, the histogram processing module 90 can detect where the peak of histogram occurs, that is, which bin has the most results (a statistical mode). To illustrate the procedure, assume the peak occurs at the Ith bin. The Ith bin (from $2\pi(I-1)/L$ to $2\pi I/L$) represents the possible values for n from $N(I-1)/L$ to $NI/L$. Therefore, the estimation of n can be chosen as $N(I-0.5)/L$, i.e., the average of the possible values.

Once the symbol timing offset is estimated, the symbol timing synchronization can be easily achieved by adjusting the boundaries of each time domain OFDM symbol. A positive n means that the current boundaries are behind the correct boundaries and need to be moved ahead by n samples. A negative n means the boundaries need to be delayed by n samples.

The present invention discloses a low complexity and high performance system for OFDM symbol timing synchronization in frequency domain. The estimation of timing offset utilizes the phase angle of each tone calculated from FFT of received training symbols. A simple circuit is devised to calculate the differences in the phase angles of neighboring tones; the differences are caused by any offset in symbol timing and thus contain information of symbol timing. A robust statistical method based on histograms is devised to process the phase differences and determine the timing offset. Finally, the system compensates any timing offset and achieves symbol timing synchronization.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for symbol timing synchronization in an orthogonal frequency division multiplexing (OFDM) communication system, the method comprising:
   (a) converting a time domain digital signal to a corresponding frequency domain digital signal;
   (b) calculating phase angles of tones of at least one symbol of the frequency domain digital signal when a symbol timing offset exists;
   (c) calculating at least one differential phase offset (DPO), which is the difference between two consecutive gaps, wherein a gap is the difference between the phase angle of a tone of the symbol of the frequency domain digital signal when the timing offset of the symbol exists and a correct phase angle of the tone of the symbol of the frequency domain digital signal; and
   (d) estimating the symbol timing offset utilizing a histogram of a group of DPOs, wherein the histogram is obtained by dividing the interval 0 to $2\pi$ into a plurality of sub intervals, and counting the number of DPOs that fall into each sub interval.

2. The method of claim 1 further comprising removing a cyclic prefix and/or suffix from between contiguous symbols before converting the time domain digital signal to the corresponding frequency domain digital signal.

3. The method of claim 1 wherein the calculations of the gaps and the DPOs are performed with mod $2\pi$ arithmetic, the values of the gaps and the DPOs being within the range of 0 to $2\pi$.

4. The method of claim 1 wherein estimating the symbol timing offset comprises utilizing a mean of a group of DPOs.

5. The method of claim 1 wherein estimating the symbol timing offset comprises utilizing a median of a group of DPOs.

6. The method of claim 1 wherein utilizing the histogram to estimate the symbol timing offset further comprises selecting a median of the range represented by the sub interval that the most DPOs fall into as the symbol timing offset.

7. The method of claim 1 wherein the sizes of each sub interval are equal.

8. A symbol timing synchronization system for an orthogonal frequency division multiplexing (OFDM) communication system, the symbol timing synchronization system comprising:
   a serial-to-parallel converter for performing serial-to-parallel conversion on an input time domain digital signal;
   a fast Fourier transform (FFT) module electrically connected to the serial-to-parallel converter for transforming the time domain digital signal into a frequency domain digital signal; and
   a demodulator electrically connected to the FFT module comprising:
      a symbol timing offset estimator comprising:
         a phase calculator electrically connected to the FFT module for calculating phase angles of tones of at least one symbol of the frequency domain digital signal output from the FFT module when a symbol timing offset exists;
         a phase offset calculator electrically connected to the phase calculator for calculating at least one differential phase offset (DPO), which is the difference between two consecutive gaps, wherein a gap is the difference between the phase angle of a tone of the symbol of the frequency domain digital signal when the timing offset of the symbol exists and a correct phase angle of the tone of the symbol of the frequency domain digital signal; and
         an estimating module electrically connected to the phase offset calculator for utilizing a histogram of a group of DPOs, wherein the histogram is obtained by dividing the interval 0 to $2\pi$ into a plurality of sub intervals, and counting the number of DPOs that fall into each sub interval; and
      a demodulation module for demodulating the frequency domain digital signal.

9. The symbol timing synchronization system in claim 8 wherein the estimating module calculates a mean of a group of DPOs and utilizes the mean to estimate the symbol timing offset.

10. The symbol timing synchronization system in claim 8 wherein the estimating module calculates a median of a group of DPOs and utilizes the median to estimate the symbol timing offset.

11. The symbol timing synchronization system in claim 8 wherein the serial-to-parallel converter removes a prefix and/or suffix from between symbols.

12. The symbol timing synchronization system in claim 8 wherein the estimating module utilizes the histogram to estimate the symbol timing offset by selecting a median of the range represented by the sub interval that the most DPOs fall into as the symbol timing offset.

13. The symbol timing synchronization system in claim 8 wherein the sizes of each sub interval are equal.

* * * * *